Nov. 24, 1953  E. C. HORTON  2,659,923
WINDSHIELD WIPER BLADE
Filed Sept. 20, 1950
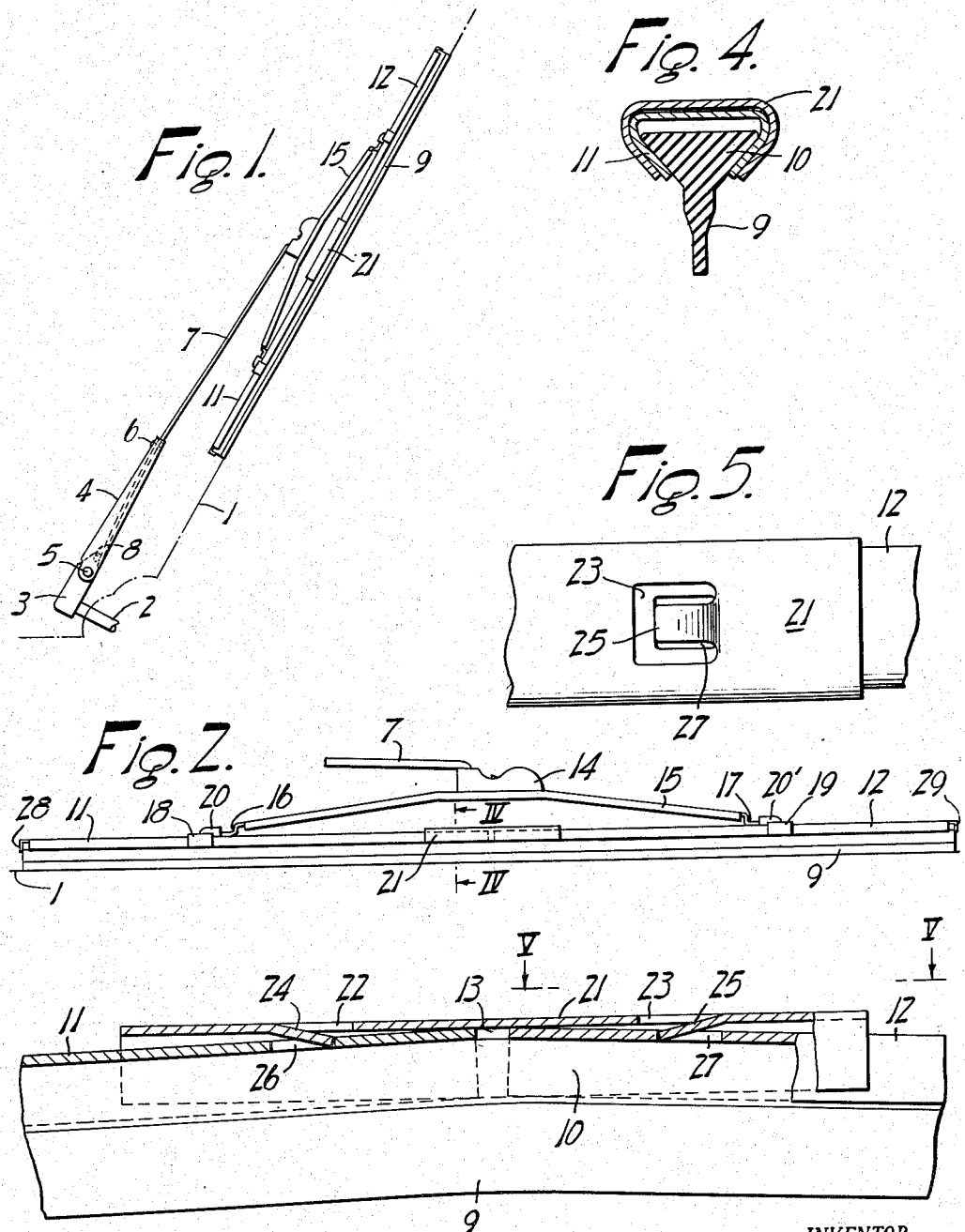
INVENTOR.
Erwin C. Horton
BY
Bean, Brooks, Buckley & Bean.
ATTORNEYS Patented Nov. 24, 1953

2,659,923

UNITED STATES PATENT OFFICE 2,659,923

WINDSHIELD WIPER BLADE

Erwin C. Horton, Hamburg, N. Y., assignor to
Trico Products Corporation, Buffalo, N. Y.

Application September 20, 1950, Serial No. 185,732

13 Claims. (Cl. 15—245)

This invention relates to an improved windshield wiper blade, and more particularly to an improved windshield wiper blade for use with a flat windshield.

It is a primary object of this invention to provide a windshield wiper blade for use with a flat windshield, which blade is of sufficient flexibility to adapt itself to any unevenness in the surface of such flat windshield.

Another and primary object is to provide a flexible windshield wiper blade for use with flat windshields having incorporated therein means limiting its flexibility whereby to prevent portions of the wiper blade from being lifted off the windshield by reason of its flexing action.

It is a further object of this invention to provide a windshield wiper blade of limited flexibility for use with flat windshields, which blade is relatively inexpensive to manufacture, simple in construction, easy to install, and provides a positive and effective cleansing action at all times.

With the foregoing and other objects in view, this invention comprises a new and useful windshield wiper blade to be described in detail hereinafter.

For a better understanding of the present invention, reference is hereby made to the accompanying drawing wherein like reference numerals denote like parts in the several views and wherein:

Fig. 1 is a side view of the entire windshield wiper assembly mounted in position against a flat windshield;

Fig. 2 is a view in side elevation showing the windshield wiper blade and a portion of its actuating arm;

Fig. 3 is a fragmentary view in section showing the means for limiting the flexibility of the wiper blade;

Fig. 4 is a sectional view taken along the line IV—IV of Fig. 2; and

Fig. 5 is a fragmentary plan view taken along the line V—V of Fig. 3.

The well known flat windshields in use on vehicles, although supposedly possessed of a flat surface, actually present a surface of considerable unevenness. This unevenness is at times the result of a fault in the glass, and at other times is simply the result of the impossibility of mass producing a flat windshield having a perfectly flat, smooth surface.

Because of the uneven surface present in flat windshields, the old, rigid type of windshield wiper blade does not effectively cleanse the same since it is unable to follow the uneven surface thereof.

This led to the development of a flexible windshield wiper blade which would follow and adapt itself to an uneven windshield surface. However, the prior art flexible windshield wiper blades present a serious disadvantage in that at times a portion of the wiper blade is lifted off the windshield because of an extreme flexing action in one direction, with the result that the cleansing action of said portion either decreases in effectiveness or disappears entirely.

The present invention provides a windshield wiper blade of limited flexibility which possesses the advantages of the flexible windshield wiper blades of the prior art, and at the same time eliminates the above mentioned disadvantage thereof.

Referring to the accompanying drawing, 1 denotes a flat windshield and 2 the conventional windshield wiper oscillating shaft or rockshaft. Rockshaft 2 is connected at its inner end to any conventional driving means, not illustrated. A mounting section 3 is secured to the outer end of rockshaft 2, and an extension 4 is pivotally attached to said mounting section by means of a pivot pin 5. Secured to the underside of extension 4 as by a rivet 6, is an actuating arm 7 at the outer or terminal end of which is mounted the wiper blade assembly. The inner end of arm 7 coacts in a conventional manner with a pin 8 on mounting section 3 whereby to press arm 7 and consequently the wiper blade assembly inwardly toward the windshield, arm 7 being made of a resilient material.

The wiper blade assembly comprises a conventional wiper body 9 having an enlarged top portion 10. A split or two-part channel assembly comprising members 11 and 12 loosely grips the enlarged top portion 10 of wiper 9 with the split therein occurring at approximately the center of the wiper as at 13. These channel members are so shaped as to loosely but securely grip the top portion 10 of the wiper body 9, whereby wiper body 9 is permitted a "flip-flop" action within said channel members. It should be noted that channel members 11 and 12 include downwardly depending side portions which extend inwardly along the underside of top portion 10 of wiper 9, whereby to securely grip said top portion.

The split between the channel members 11 and 12, occurring along the wiper body 9 at point 13, permits the wiper blade to flex freely at this point, which in turn permits the wiper blade to adjust itself to any unevenness in the windshield surface.

Alternatively, instead of providing a split or two-part channel assembly as illustrated, I may use a single channel member having a notched or slotted central portion, as disclosed in co-pending application Serial No. 132,906 for a Wiper Blade, filed December 14, 1949, by Raymond Deibel. This also provides a flexible wiper blade.

The wiper blade assembly is detachably secured to actuating arm 7 by means of a conventional attaching member 14. Secured to the underside of attaching member 14, is a pressure distributing yoke member 15 which extends outwardly from opposite sides of attaching member 14 and in a direction generally parallel to the edge of actuating arm 7. Tongues 16, 17, formed as a part of yoke member 15, extend outwardly at each end thereof. Tongue receiving members 18 and 19 are securely attached, one each, to channel members 11 and 12 by any conventional means, such as a detent. These tongue receiving members have raised portions 20 and 20' thereon, which raised portions are adapted to receive the tongue portions 16 and 17 with a slightly loose fit. The tongue receiving members 18 and 19 are so mounted on channel members 11 and 12 as to provide a limited amount of play between yoke member 15 and said tongue receiving members.

When a windshield cleansing operation is set in motion, rockshaft 2 is driven by any of a number of conventional driving means, not illustrated. Rockshaft 2 imparts an oscillatory motion to actuating arm 7, which in turn moves the wiper body 9 back and forth across the windshield in a fixed path, the flexible wiper body 9 freely adjusting itself to any unevenness in the windshield surface.

However, as previously discussed hereinabove, it has been found that with a flexible wiper blade there is a tendency for portions of the wiper body to be lifted off the windshield. The present invention prevents this undesirable action by providing a guide member 21 which fits around the inner ends of channel members 11 and 12 with a sliding fit and covers the portion 13 of a wiper body 9 which is not covered by said channel members. Guide member 21 is slightly larger than necessary to fit around channel members 11 and 12, and has downwardly depending side portions extending inwardly along the corresponding downwardly depending and inwardly extending side portions of channel members 11 and 12, whereby to permit only a limited amount of up and down movement of said channel members within said guide member. The downwardly depending and inwardly extending side portions of guide member 21 form a bearing surface for channel members 11 and 12. Guide member 21 has two cut out portions 22 and 23 in the top thereof with inwardly extending tongues 24 and 25 depending slightly downward therefrom. As clearly illustrated in Fig. 3, tongues 24 and 25 are adapted to abut against the shoulder-defining inner edge of apertures 26 and 27 formed near the inner end of channel members 11 and 12 respectively. In this manner each of said channel members is permitted a limited sliding movement within guide member 21, said channel members being limited in their inward movement by abutment against each other, and being limited in their outward movement by tongues 24 and 25. Thus, tongues 24 and 25 and the shoulder-defining apertures 26 and 27 comprise detent means cooperating to interlock members 11, 12 and 21. Channel members 11 and 12 also have downwardly extending flange portions 28, 29 at their outer ends whereby to limit relative sliding movement between said channel members and wiper body 9.

Thus it is apparent that guide member 21, by providing a limited freedom of up and down movement of channel members 11 and 12, with positive resistance thereto beyond a predetermined point, provides a limited flexibility in the wiper blade which permits the wiper blade to freely adjust to any unevenness in the windshield surface and at the same time prevents portions of the wiper body from being lifted off the windshield. If the flexing action of the wiper blade is such as to tend to lift the center portion of the wiper body a predetermined amount of upward movement will be permitted, but beyond that point the inner ends of channel members 11 and 12 will abut against the central portion of guide member 21 which will positively resist any further upward movement. This is clearly illustrated in Fig. 3. If, on the other hand, it is the end portions of the wiper body which are being lifted, upon a limited degree of upward movement channel members 11 and 12 will abut against the outer ends of guide member 21 and further upward movement will be prevented. Obviously, the amount of freedom of up and down motion of the channel members can be varied by varying the depth of the guide member and consequently the amount of play between the guide member and the channel members.

Thus it is apparent that the present invention, through the use of a split channel assembly and a center guide surrounding the channel members at their inner ends and covering the split portion, provides a windshield wiper blade of limited flexibility which will permit the wiper blade to adjust itself to any unevenness in a windshield surface and will prevent portions of the wiper body from being lifted off the windshield surface by reason of such unevenness.

Obviously, modifications of the present invention will be apparent to one skilled in the art, and it is my intention to include the same within the scope of the appended claims.

Having fully disclosed and completely described a preferred embodiment of my invention, and the mode of operation thereof, what I claim as new is:

1. In a windshield wiper blade adapted for use with flat windshields, a wiper body, relatively movable rigid holder sections loosely gripping the top edge of said wiper body and adapted through relative movement to impart flexibility to said wiper blade, said holder sections extending along said top edge in end to end relation, guide means carried by and connecting the adjacent ends of adjacent holder sections with a predetermined clearance between said holder sections and said guide means permitting of such relative movement and having means acting beyond said predetermined clearance positively to join said sections for movement in unison, and means for releasably securing said wiper blade to a windshield wiper actuating means.

2. A windshield wiper blade comprising a wiper body, a channel assembly comprising relatively movable sections extending along and gripping the top portion of said wiper body, said channel assembly having top wall and downwardly depending and inwardly extending side wall portions, guide means having top wall and downwardly depending and inwardly extending side wall portions loosely secured to said channel assembly in overlapping bridging relation with the movable sections thereof for limiting the relative movement of said movable sections, said guide means side wall portions acting as bearing surfaces for said movable channel assembly sections, and means for releasably attaching said wiper blade to a windshield wiper actuating means.

3. In a windshield wiper blade a wiper body, a channel assembly secured to said wiper body to extend along one margin thereof and having a discontinuity therein whereby to impart flexibility to said wiper blade, a guide member embracing said channel assembly with a predetermined clearance and extending therealong across said discontinuity in spaced relation with said wiper body, said guide member having means positively limiting the flexibility of said wiper blade, and attaching means secured to said channel assembly for attaching said wiper blade to a windshield wiper actuating means.

4. In a windshield wiper blade adapted for use with flat windshields, a wiper body, a plurality of channel members loosely gripping the top edge of said wiper body whereby to permit a flip-flop motion of the wiper therein, said plurality of channel members being arranged in end to end relation and spaced apart whereby to impart flexibility to said wiper blade, channel-shaped guide means loosely gripping the inner ends of adjacent channel members and extending therebetween whereby to limit the up and down movement of said channel members and thus limit the flexibility of said wiper blade, and separate means secured to said channel members for releasably attaching said wiper blade to a windshield wiper actuating means.

5. A windshield wiper blade adapted for use with flat windshields comprising a wiper body, a plurality of channel members secured to said wiper body in spaced end to end relation along one margin thereof whereby to impart flexibility to said wiper blade, said channel members being secured to said wiper body with a loose gripping fit permitting a flip-flop motion of said wiper body within said channel members, a channel-shaped guide member extending along said margin of said wiper body between said channel members and connecting the adjacent ends of said channel members with a slightly loose sliding fit whereby to limit the flexibility of said blade, means defining a shoulder in the inner end of each of said channel members, detents on said guide member cooperating with said shoulders to maintain said guide member and said channel members in interfitting relation, and means connected to said channel members for releasably attaching said wiper blade to a windshield wiper actuating means.

6. A windshield wiper blade adapted for use with flat windshields comprising a wiper body, a pair of channel members secured to the top portion of said wiper body in end to end relation and with a loose gripping fit whereby to permit a flip-flop motion of the wiper body therein, said channel members being spaced apart at the center of said top portion leaving the same unenclosed whereby to impart flexibility to said wiper blade, a guide member bridging said unenclosed top portion and embracing the inner end of each of said channel members with a slightly loose sliding fit whereby to limit the up and down motion of said channel members and thus limit the flexibility of said wiper blade, means defining an aperture on the inner end of each of said channel members, downwardly inclined portions on said guide member cooperating with each of said apertures to maintain said guide member and said channel members in interfitting relation, and means secured to said channel members for releasably attaching said wiper blade to a windshield wiper actuating means.

7. In a windshield wiper blade adapted for use with flat windshields, a wiper body, a discontinuous channel member extending along and loosely gripping the top edge of said wiper body whereby to permit a limited flip-flop motion of the wiper body in said channel member, the discontinuity in said channel member serving to impart flexibility to said wiper blade, channel-shaped guide means loosely gripping said discontinuous channel member and extending therealong to bridge said discontinuity whereby to limit the freedom of relative up and down movement of the portions of said channel member on opposite sides of said discontinuity and thus limit the flexibility of said wiper blade, a yoke member secured at each end to said channel member at spaced points intermediate the opposite ends thereof and said discontinuity, and means on said yoke member for releasably attaching said wiper blade to a windshield wiper actuating means.

8. A windshield wiper blade adapted for use with flat windshields comprising a wiper body, a plurality of channel members secured to the top edge of said wiper body with a loose gripping fit and extending therealong in end to end relation, said channel members being spaced apart in the central region of said wiper body to provide a flexible unenclosed portion thereof, a guide means having its opposite end portions mounted on the inner ends of said channel members with a slightly loose sliding fit and extending therebetween whereby to limit the flexibility of said unenclosed portion, a yoke member having a tongue at each end thereof, tongue receiving means on each of said channel members and adapted to receive said tongues with a slightly loose fit, and means secured to said yoke member for releasably attaching said wiper blade to a windshield wiper actuating means.

9. In a windshield wiper blade adapted for use with flat windshields, a flexible wiping body, a plurality of channel members secured along one margin of said wiping body in end to end relation, said channel members being spaced apart adjacent the central portion of said wiping body to impart flexibility to said blade, a yoke member having outwardly extending tongues at opposite ends thereof, tongue receiving means carried by each of said channel members and slidably receiving said tongues, a guide member bridging adjacent ends of said channel members to limit the flexibility of said blade, and means locking said guide member to said channel members and including stop means limiting outward movement of said channel members to prevent separation of said tongues and tongue receiving means.

10. A windshield wiper blade adapted for use with a flat windshield comprising a wiper body, a two-part channel assembly secured to one edge of said wiper body and comprising relatively long sections arranged in slightly spaced end to end relation leaving the central portion of said wiper body exposed whereby to impart flexibility to said wiper blade, a relatively short guide member embracingly secured to the adjacent ends of said channel sections with a slightly loose fit and extending therebetween in spaced apart relation with said wiper body to limit the flexibility of said wiper blade, said guide member locking said channel sections together for movement in unison following a predetermined flexing action of said blade, and means for attaching said wiper blade to a windshield wiper actuating means.

11. A windshield wiper blade adapted for use with flat windshields comprising a wiping body, a plurality of spaced channel members attached to the top edge of said wiping body in end to end relation and adapted through relative movement to impart flexibility to said wiper blade, a channel-shaped guide member loosely overlying and telescopically embracing adjacent ends of said channel members and extending therebetween to limit said relative movement, and means for attaching said wiper blade to an actuating means.

12. A windshield wiper according to claim 1, wherein said adjacent ends of said holder sections and said guide means telescope and have cooperating detent means acting to interlock said holder sections to said guide means, such interlock being effected by and during telescopic placement of said holder sections and said guide means on the wiper body.

13. A windshield wiper according to claim 1, wherein said guide means and said adjacent ends of said holder sections have telescopically related parts formed with spring detent means acting to permit operative placement of said holder sections and said guide means against separation.

ERWIN C. HORTON.

References Cited in the file of this patent

UNITED STATES PATENTS

| Number | Name | Date |
|---|---|---|
| 1,694,245 | Baker | Dec. 4, 1928 |
| 2,128,454 | Cullin | Aug. 30, 1938 |
| 2,303,694 | Horton | Dec. 1, 1942 |

FOREIGN PATENTS

| Number | Country | Date |
|---|---|---|
| 427,383 | Great Britain | Apr. 23, 1935 |